United States Patent Office 3,773,847
Patented Nov. 20, 1973

3,773,847
PROCESS FOR THE PREPARATION OF ISOPRENE FROM ISOBUTENE AND FORMALDEHYDE
Paul Losacker, Leichlingen, Wulf Schwerdtel, Cologne, and Wolfgang Swodenk, Odenthal-Globusch, Germany, assignors to Bayer Aktiengesellschaft, Leverkusen, Germany
Filed Sept. 7, 1971, Ser. No. 178,043
Claims priority, application Germany, Sept. 9, 1970, P 20 44 623.5
Int. Cl. C07c 1/20
U.S. Cl. 260—681    12 Claims

ABSTRACT OF THE DISCLOSURE

Isoprene is prepared by reacting in a first stage isobutene or a $C_4$-hydrocarbon mixture which contains isobutene with an aqueous formaldehyde solution at a molar ratio of isobutene to formaldehyde of from 1:1 to 1:2 in the presence of from 0.01 to 1.5% by weight of orthophosphoric acid, based on the quantity of aqueous formaldehyde, at a temperature in the range of 90° C. to 180° C.; separating the reaction mixture produced into an organic phase which contains 4,4-dimethyl-m-dioxane and an aqueous phase; evaporating the aqueous phase to remove the by-products and phosphoric acid dissolved therein; feeding together, in a second stage the 4,4-dimethyl-m-dioxane formed and the by-products which contain phosphoric acid obtained on evaporation of the aqueous phase, in the liquid state into a reactor which is operated at 200° C. to 400° C.; and returning the formaldehyde solution obtained from the decomposition reaction of the second stage which contains phosphoric acid to the first reaction stage.

---

It is known that isobutene and formaldehyde may be condensed in the presence of acid catalysts to form 4,4-dimethyl-1,3-dioxane which in turn may be decomposed in the presence of catalysts which contain phosphoric acid or phosphates to form isoprene, formaldehyde and water. The following are mentioned by way of example: The process of the French Petroleum Institute, described in Erdol und Kohle 15, pages 274–282 and 348–352 (1962); a process performed in Russia, described in Z. vses. chim. Obsc. 14, 3, pages 313–319 (1969), DAS 1,271,-106 and a process of Farbenfabriken Bayer AG, DAS 1,233,880 and Belgian patent specification No. 735,564.

In the above mentioned processes, the reaction of isobutene with formaldehyde to form 4,4-dimethyl-m-dioxane is carried out in the presence of dilute sulphuric acid or of an acid ion exchange as a catalyst and the decomposition of 4,4-dimethyl-m-dioxane into isoprene, formaldehyde and water is carried out in the presence of phosphoric acid or acid phosphates, the phosphoric acid or acid phosphate catalysts being optionally mounted on catalyst carriers. In this reaction, the acid which evaporates with the reaction products must be replaced and the level of free acidity, which is reduced as a result of thermal conversions in the phosphates and the phosphoric acid, must be maintained by the introduction of phosphoric acid in the decomposition reaction.

According to DAS 1,271,106 and DAS 1,813,354, replacement of phosphoric acid is effected by the addition of from 0.02 to 0.06% by weight or 0.001 to 0.1% by weight of orthophosphoric acid (based on the quantity of steam used) with the steam added in the decomposition reaction, or according to Belgian Pat. No. 735,564 it is effected by the addition of phosphoric acid esters, e.g. from 0.1 to 0.2% by weight of tri-isobutylphosphate, based on the quantity of the starting material, together with the dioxane starting material and preferably homogeneously dissolved in this starting material.

In the processes described above, the preparation of 4,4-dimethyl-m-dioxane is accompanied by the formation of numerous by-products some of which are very highly water-soluble and not volatile together with steam. Accordingly, these by-products remain in solution when water and the products which are volatile with steam are stripped off to concentrate the acid in the cycle.

When sulphuric acid is used as the catalyst and the process is performed continuously, the concentration of these by-products progressively increases during concentration of the acid (removal of the water introduced with the aqueous formaldehyde solution) but it can only increase to the point at which coking occurs and some of the acid must therefore be continuously removed from the cycle and replaced by fresh acid. Elimination or working up of these products involves considerable technical expenditure.

When acid ionic exchangers are used as catalysts for the production of 4,4-dimethyl-m-dioxane from isobutene and formaldehyde (DAS 1,233,880) these difficulties of carrying the catalyst in the cycle may be obviated by mechanical separation of the catalyst and waste water. According to French Pat. No. 1,554,055, the water-soluble organic products may be isolated by complete evaporation from the resulting waste water which is practically free from acid, and according to Belgian Pat. No. 735,564 these water-soluble organic products may be put into the decomposition reaction together with the dioxane starting material and used for the production of isoprene.

In addition to the use of sulphuric acid or acid ionic exchangers for the production of 4,4-dimethyl-m-dioxane it is also known to use other mineral acids, e.g. orthophosphoric acid, as catalysts for the reaction of isobutene with formaldehyde.

Thus, E. Arundale and L. A. Mikesa have demonstrated in Chem. Reviews, 51, page 508 (1952) that moderate yields of 4,4-dimethyl-m-dioxane (abbreviated in the following tables as 4,4-D-m-DX) are obtained when 8% ortho-phosphoric acid is used at elevated temperatures and that the yield can be improved by using 75% orthophosphoric acid at low temperatures, and they report that the results obtained with phosphoric acid are always poorer than those obtained with sulphuric acid. It is similarly shown in U.S. Pat. No. 2,997,480 that it is necessary to use higher concentrations of phosphoric acid (in the region of from 15 to 25% by weight) and that when mineral acids are used as catalyst the temperature of 85° C. should not be exceeded, on the one hand in order to maintain sufficiently high acidity in the reaction mixture and on the other hand in order to prevent decomposition of dioxane. It is similarly reported in U.S. Pat. No. 3,390,059 that 4,4-dimethyl-m-dioxane may be prepared with orthophosphoric acid used at concentrations of from 5 to 25% by weight but that it is necessary to avoid elevated temperatures at which decomposition of dioxane occurs.

It has now surprisingly been found that if the reaction conditions described below are observed, 4,4-dimethyl-m-dioxane may be obtained in high yields in the presence of from 0.01 to 1.5% by weight of phosphoric acid, preferably 0.03 to 0.5% by weight of phosphoric acid, based on the quantity of aqueous formaldehyde, and that the water-soluble by-products of the synthesis can be isolated by complete evaporation in the presence of the acid so that the acid remains in solution in the organic residue.

SUMMARY

The process of this invention is characterised in that isobutene or a $C_4$-hydrocarbon mixture which contains isobutene is reacted in a first stage with an aqueous formaldehyde solution in a molar ratio of 1:1–2 in the presence of from 0.01 to 1.5% by weight of orthophosphoric acid, based on the quantity of aqueous formaldehyde, at a temperature in the range of from 90° C. to 180° C., the resulting reaction mixture is separated into an organic phase which contains 4,4-dimethyl-m-dioxane and an aqueous phase, the aqueous phase is evaporated in order to remove the by-products and phosphoric acid dissolved in it, the resulting 4,4-dimethyl-m-dioxane and the by-products which contain phosphoric acid, which by-products have been obtained from evaporation of the aqueous phase, are together fed in the liquid state into a fluidised bed reactor which is operated at a temperature of from 200° C. to 400° C., and the formaldehyde solution which results from the decomposition reaction and which contains phosphoric acid may be returned to the first reaction stage.

DESCRIPTION

Figure 1:
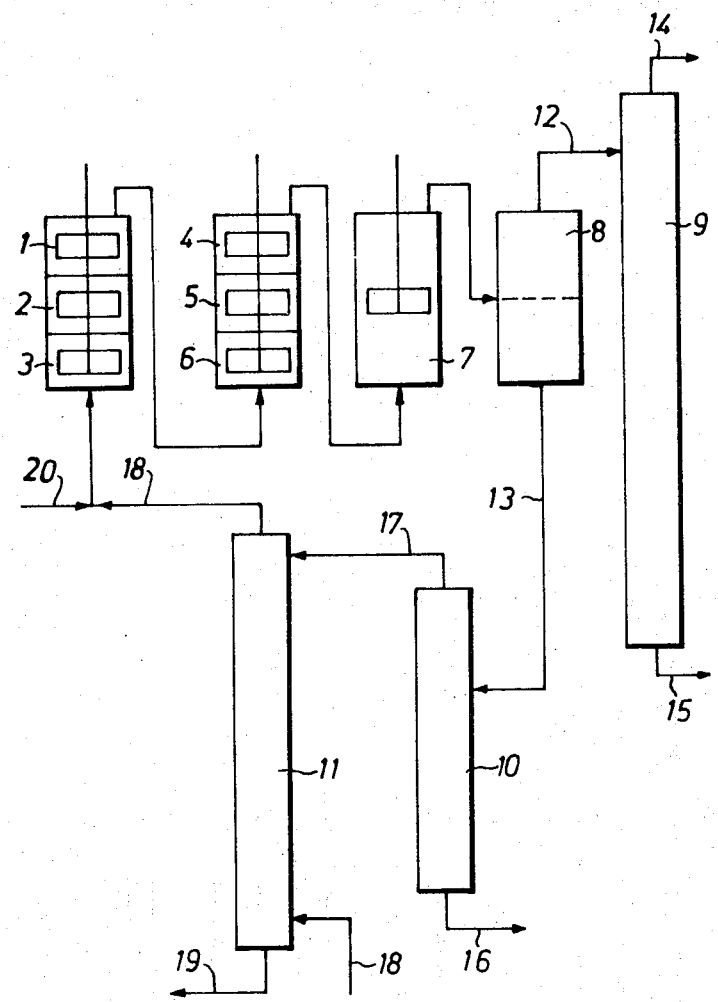
FIG. 1 is a schematic flow sheet for the continuous preparation of 4,4-dimethyl-1,3-dioxane in stage one of the invention.

The new process therefore provides a technically very advantageous method of synthesising isoprene since the phosphoric acid which is introduced in the first reaction stage is recovered together with the water-soluble by-products by being dissolved in these by-products and may then be used together with 4,4-dimethyl-m-dioxane in the dioxane decomposition stage to maintain the acidity of the catalyst. Moreover, in this method the phosphoric acid removed from the decomposition reaction together with the reaction products may be utilised by returning them as catalyst to the first reaction stage together with the formaldehyde returned to this stage so that a closed catalyst cycle between the stage of preparation of dioxane and the stage of decomposition of the dioxane may be achieved.

Replacement of the phosphoric acid which is lost in the second reaction stage on regeneration of the catalyst may be carried out either by adding phosphoric acid to the fresh formaldehyde solution of the first reaction stage or by adding phosphoric acid esters to the starting materials of the decomposition reaction, the esters then decomposing under the reaction conditions to liberate phosphoric acid. Compounds of this type have been described e.g. in Ullmanns Enzyklopadie der techn. Chemie, vol. 13, pages 594–595 (Edition 3, 1962). Triethylphosphate, tri-n-butylphosphate and tri-isobutylphosphate are mentioned as examples. The carrier materials used for phosphoric acid may be those mentioned in Belgian Pat. No. 735,564, e.g. carriers which contain mainly silicic acid.

The process may in principle be carried out as follows: Formaldehyde and isobutene in the form of a $C_4$- fraction containing isobutene are introduced into a cascade of reactors and reacted in the liquid phase. The conversion of formaldehyde is advantageously carried out as nearly as possible quantitatively and isobutene is added in excess, the $C_4$ mixture which remains being removed after completion of the reaction. Vigorous mixing of the two phases is essential for the catalytic reaction. The cascade of reactors may be arranged as desired and instead of reaction vessels, reaction coils or other types of containers may be used. When phosphoric acid is used at the concentration according to the invention of from 0.01 to 1.5%, a pressure which is sufficiently high to keep the reaction mixture in the liquid phase is employed. The reaction temperature employed is in the range of from 90° C. to 180° C., preferably 120° C. to 160° C.

The two phases are separated after the reaction. Unreacted $C_4$-mixture is removed from the organic phase by distillation and crude 4,4-dimethyl-m-dioxane which is obtained as the sump product of this column is conveyed to the decomposition reactor together with all the by-products formed during the production of 4,4-dimethyl-m-dioxane.

The aqueous phase from this separator is evaporated to recover phosphoric acid and any other reaction products still contained in it, and the distillation sump is introduced into the decomposition reaction together with crude dioxane. Purification, e.g. by extraction, may be carried out before or after evaporation of the aqueous phase. For this extraction, the $C_4$-mixture put into the reaction may be used as an extracting agent.

The process for the catalytic decomposition of 4,4-dimethyl-1,3-dioxane to isoprene, formaldehyde and water may be carried out in any conceivable physical form, e.g. a fixed bed, moving bed or fluidised bed. The process according to the invention is preferably carried out in a fluidised bed, the coke deposited on the catalyst being burnt off in a regenerator and the catalyst being continuously circulated. The catalyst used is in the form of a carrier, preferably silicic acid, impregnated with phosphoric acid. It is not essential to impregnate the catalyst before the reaction since it slowly becomes charged with the phosphoric acid in the cycle but since this requires a considerable length of time it is advantageous to start with a carrier which is already impregnated with phosphoric acid. The decomposition reaction is advantageously carried out at temperatures of from 200° C. to 400° C., preferably 250° C. to 320° C. Steam may be injected into the reactor to facilitate the decomposition reaction and to assist in the maintenance of the fluidised state.

The reaction products leave the decomposition reactor and are condensed in conventional manner. When the process is carried out in a fluidised bed, it is advantageous to use a system of cyclones in order first to remove the catalyst. Cooling and condensation of the reaction products is advantageously carried out in a quenching system. The condensed reaction products separate into two phases: An upper organic phase and a lower aqueous phase. The aqueous phase contains the phosphoric acid discharged from the decomposition system and this phosphoric acid may be circulated and returned to Stage 1 as catalyst together with formaldehyde which is also present in the aqueous phase.

The upper phase of the reaction products obtained behind the cooling system is worked up by distillation in known manner to yield pure isoprene. Components which cannot be condensed, e.g. isobutene, may be liquefied by compression.

According to the invention, for Stages 1 and 2 of the process phosphoric acid is circulated through both stages.

The process according to the invention will now be further described with the aid of the following examples which serve only to explain the process but do not in any way limit it to the special embodiments.

Example 1

Using an autoclave having a capacity of 0.7 litres and equipped with a stirrer, 151 g. of 37% by weight of a formaldehyde solution were stirred at various temperatures with various quantities of phosphoric acid and 200 g. of a $C_4$-hydrocarbon mixture which had an isobutene content of 46.5 volumes percent. In each case, the stirring was stopped after one hour, and after cooling of the reaction mixture, the excess of $C_4$-hydrocarbons was released through a gas pipette (for analysis) and a gas meter to measure the quantity. The residue was then separated into an aqueous phase and an organic phase and both products were investigated by gas chromatography. The results are shown in Table 1.

Table 2

151 g. of 37% by weight of a formalin solution and 200 g. of a $C_4$-mixture containing 46.5% of isobutene were stirred for 20 minutes in the apparatus described in Example 1 at various temperatures and with various amounts of phosphoric acid. The product was then worked up as in Example 1. The results are shown in Table 2.

TABLE 1

| Ex. No. | Temperature, °C. | Pressure excess, atmospheres | H₃PO₄ in Formalin, percent by weight | Formaldehyde conversion, percent | Isobutene conversion, percent | Dioxane selectivity based on— | |
|---|---|---|---|---|---|---|---|
| | | | | | | Converted formaldehyde, percent | Converted isobutene, percent |
| 1 | 140 | 35 | 0.28 | 97.9 | 67.9 | 78.1 | 62.9 |
| 2 | 130 | 30 | 0.28 | 90.6 | 56.2 | 76.8 | 62.5 |
| 3 | 130 | 31 | 0.56 | 96.3 | 63.8 | 80.3 | 68.7 |
| 4 | 120 | 23 | 0.56 | 86.2 | 48.8 | 67.2 | 66.7 |

TABLE 2

| Ex. No. | Temperature, °C. | Pressure excess, atmospheres | H₃PO₄ in formalin, percent by weight | Formaldehyde conversion, percent | Isobutene conversion, percent | Dioxane selectivity based on— | |
|---|---|---|---|---|---|---|---|
| | | | | | | Converted formaldehyde, percent | Converted isobutene, percent |
| 1 | 110 | 19 | 1.13 | 56.7 | 29.6 | 68.2 | 73.3 |
| 2 | 110 | 22 | 0.56 | 54.4 | 30.5 | 67.3 | 67.6 |
| 3 | 130 | 26 | 0.28 | 62.5 | 36.5 | 62.8 | 63.7 |
| 4 | 140 | 32 | 0.28 | 88.9 | 57.5 | 69.0 | 59.3 |
| 5 | 140 | 40 | 0.14 | 72.7 | 44.9 | 79.5 | 72.2 |
| 6 | 170 | 58 | 0.14 | 94.0 | 63.5 | 71.3 | 59.3 |

Example 3

(a) Preparation of 4,4-dimethyl-1,3-dioxane: The arrangement of the experiment for the continuous preparation of 4,4-dimethyl-1,3-dioxane is illustrated in the accompanying FIG. 1.

12.1 kg. per hour of 37% formaldehyde 20 containing 0.24% by weight of phosphoric acid as catalyst and 12.9 kg./hour of a C₄-cracking fraction 18 which had been freed from butadiene by extractional distillation and which contained 6.1 kg. of isobutene were pumped through a cascade of 7 stirrer vessels which had a total volume of 20.4 litres and of which reactors 1 to 3 had been obtained by partitioning one large chamber into three and reactors 4 to 6 had been obtained by partitioning another large vessel into three. The reactants were passed through the vessels at a pressure of 29 excess atmospheres and at temperatures of 130° C. in vessels 1 to 3, 135° C. in vessels 4 to 6 and 137° C. in vessel 7. In addition, 2.0 kg. of water were used for rinsing the packing glands of the stirrers.

Arranged behind the last stirrer vessel was a separator 8 in which the reaction mixture was separated into an organic phase 12 and an aqueous phase 13.

The organic phase was drawn off into a distillation column 9 and fractionated into 9.4 kg./hr. of a C₄-fraction 14 at the top of the column, which fraction had an isobutene content of 28.51%, and into 6.32 kg./hr. of a crude dioxane mixture 15 at the sump, which dioxane mixture contained 82.0% of 4,4-dimethyl-1,3-dioxane. The aqueous phase 13 from the separator was distilled in a vacuum column 10, 1.1 kg./hr. of an organic residue 16 which contained 1.8% of phosphoric acid being obtained at the sump and a distillate 17 being obtained at the head. 4,4-dimethyl 1,3-dioxane and tertiary butanol were removed from ths distillate by extracting the distillate in an extraction column 11 with the C₄-fraction 18 used as starting material. After the extraction, 10.1 kg. of waste water 19 having a residual formaldehyde content of 1.36 kg./hr. were obtained from the extractor. The results of the reaction were therefore as follows:

| | Percent |
|---|---|
| Formaldehyde conversion | 69.7 |
| Isobutene conversion | 56.1 |
| Dioxane selectivity (based on formaldehyde) | 75.9 |
| Dioxane selectivity (based on the total of reacted isobutene) | 72.5 |

Residence time in the cascade, 37 minutes.

Four other series of experiments were carried out in the same arrangement. The data of these series are summarised in Table 3.

TABLE 3

| Experimental series | Formalin starting material | H₃PO₄ addition, percent | Isobutene starting material | Formaldehyde conversion, percent | Isobutene conversion, percent | Crude dioxane, kg./hr. | Content of 4,4-D-m-DX, percent | Selectivity on amount of reacted formaldehyde, percent | 4,4-D m-DX based on reacted isobutene, percent |
|---|---|---|---|---|---|---|---|---|---|
| 2 | 12.4 kg./hr. containing 4.6 kg. of HCHO (100%). | ¹ 0.12 | 12.9 kg./hr. of C₄ mixture containing 5.94 kg. of isobutene. | 49.7 | | 5.0 | 82.9 | 93.8 | |
| 3 | 11.95 kg./hr. containing 4.42 kg. of HCHO (100%). | ² 0.5 | ...do... | 79.5 | 70.3 | 7.54 | 80.5 | 89.3 | 77.2 |
| 4 | 15.0 kg./hr. containing 4.50 kg. of HCHO (100%). | 0.48 | 15.1 kg./hr. of C₄ mixture containing 7.02 kg. of isobutene. | 75.4 | 54.3 | 6.76 | 82.0 | 82.4 | 69.5 |
| 5 | 15.0 kg./hr. with returned formalin content of 4.48 kg. HCHO (100%). | 0.48 | 13.1 kg./hr. of C₄ mixture containing 6.1 kg. of HCHO (100%). | 75.8 | 57.8 | 6.15 | 82.3 | 77.6 | 64.1 |

¹ Based on formaldehyde.
² Based on Formalin.

Figure 2:
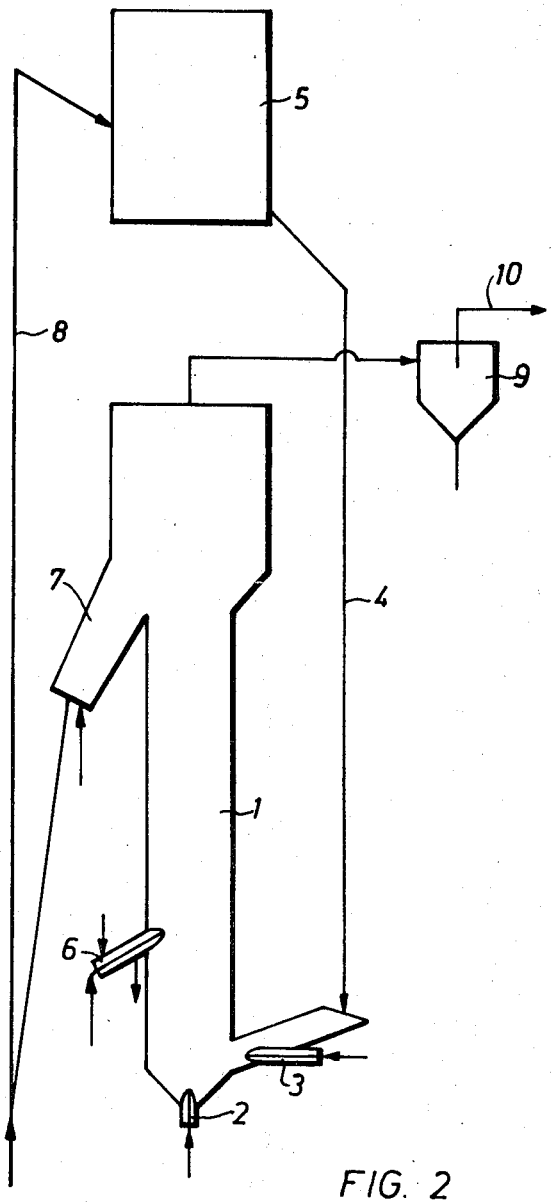
FIG. 2 is a schematic flow sheet for the decomposition of 4,4-dimethyl-1,3-dioxane in stage two of the invention.

(b) Decomposition of dioxane: Decomposition of 4,4-dimethyl-1,3-dioxane which had been prepared according to (a) was carried out in the apparatus described with reference to the accompanying FIG. 2.

The reactor 1 of the installation consisted of a tube 80 mm. in diameter and 1300 mm. in length. At the top, the tube increased to a diameter of 135 mm. over a length of 600 mm. The lower part of the reactor tapered cone-shaped and contained a nozzle 2 for the introduction of steam. Directly above the cone was a pipe connection placed laterally with a nozzle 3 for the introduction of steam to aerate the catalyst which was introduced from the regenerator 5 through a descending pipe 4. A water-cooled nozzle 6 for the introduction of the dioxane starting mixture was arranged 300 mm. above the inlet connection for mixture was arranged 300 mm. above the inlet connection for the catalyst. The catalyst arriving from the regenerator at a temperature of 580° C. to 610° C. was introduced into the lower part of the reactor and kept at a fluidised state by means of steam which was introduced through the nozzle at the rate of 3.2 kg./hr., and this catalyst was mixed with colder catalyst in the reactor. The inflow of catalyst was improved by injecting activating steam through the nozzle 3 at the rate of 400 to 600 g./hr.

12 kg. per hour of the crude dioxane obtained according to (a) which contained 0.2% by weight of triisobutylphosphate were injected cold into the reactor through the inlet nozzle for the dioxane mixture 6. The temperature in the decomposition part of the reactor was 300° C. to 310° C. and the pressure 0.2 to 0.3 excess atmospheres. The dioxane evaporated immediately after its injection and was decomposed. The catalyst and decomposition products ascended through the reactor and separated in the upper, wider part of the reactor.

The catalyst left the reactor after flowing through a stripping zone 7 in which it was stripped with 0.5 kg. of steam per hour, and it was carried in the pneumatic lift 8 into the regenerator where the coke was burnt off and the catalyst was supplied with the heat required for the decomposition reaction.

The gaseous decomposition products first entered a cyclone 9 for the removal of catalyst dust and from there they entered a quenching and compression system 10 in which they were cooled and liquefied in known manner. Finally, the various products were worked up in a distillation system. In addition, 2.0 kg. of wash water were added to the decomposition process by way of the purification system.

The following products were obtained after working up:

3.40 kg./hr. of isoprene
0.40 kg./hr. of isobutene
11.0 kg./hr. of a formaldehyde solution which was returned to the process and which contained 19% of formaldehyde and 0.01% of free phosphoric acid
1.0 kg./hr. of dioxane and other products which were returned to the process
0.33 kg./hr. of high polymer and other by-products.

The dioxane conversion was 96.3%.

The results of two additional series of experiments are shown in Table 4.

Example 4

The experiment was carried out using an arrangement which, in principle, was as described in Example 3(a) but in which a cascade of five vessels arranged in series having a total capacity of 35 litres was used. 11.9 kg./hr. of 40% formalin solution containing 0.05% by weight of orthophosphoric acid as catalyst and 15.2 kg./hr. of a $C_4$ cracking fraction which contained 6.8 kg. of isobutene and which had been freed from butadiene by extractional distillation were reacted at a pressure of 27 excess atmospheres and at a constant temperature of 135° C. in all five stirrer vessels of the cascade.

The quantity of water used as rinsing liquid for the packing glands of the stirrers was 0.9 kg./hr.

Behind the last stirrer vessel, the reaction mixture was separated in the separator into an aqueous phase and an organic phase. The organic phase was fractionated in the distillation column into 10.8 kg./hr. of a $C_4$ fraction at the top, with a residual isobutene content of 23.8%, and 8.3 kg./hr. of a crude dioxane mixture was contained 74% of pure 4,4-dimethyl-1,3-dioxane.

The aqueous phase from the separator was distilled in a vacuum column from which 0.99 kg./hr. of an organic residue containing 0.46% of phosphoric acid was obtained in the sump and the distillate obtained at the head was extracted in an extraction column with the $C_4$ fraction used as starting material to remove 4,4-dimethyl-1,3-dioxane and tertiary butanol.

After the extraction, 7.9 kg./hr. of waste water having a residual formaldehyde content of 0.6 kg./hr. were obtained from the extractor.

The results of the reaction were therefore as follows:

|  | Percent |
|---|---|
| Formaldehyde conversion | 86.4 |
| Isobutene conversion | 62.2 |
| Dioxane selectivity (based on formaldehyde) | 76.8 |
| Dioxane selectivity (based on total reacted isobutene) | 68.5 |

The residence time in the cascade was 60 minutes.

What is claimed is:

1. Process for preparing isoprene which comprises
(a) reacting in a first stage isobutene or a $C_4$-hydrocarbon mixture which contains isobutene with an aqueous formaldehyde solution at a molar ratio of isobutene to formaldehyde of from 1:1 to 1:2 in the presence of from 0.01 to 1.5% by weight of orthophosphoric acid, based on the quantity of aqueous formaldehyde, at a temperature in the range of 90° C. to 180° C.;
(b) separating the reaction mixture produced into
  (i) an organic phase which contains 4,4-dimethyldioxane and
  (ii) an aqueous phase;
(c) evaporating the aqueous phase and recovering a distillation sump containing by-products and phosphoric acid;
(d) feeding together in a second stage the
  (i) 4,4-dimethyl-m-dioxane formed and
  (ii) distillation sump containing phosphoric acid from step (c), in the liquid state into a reactor which is operated at 200° C. to 400° C.; and

TABLE 4

| Experiment | Dioxane starting mixture | Dioxane conversion, percent | Isoprene, kg./hr. | Isobutene, kg./hr. | Formalin with concentration | $H_3PO_4$ concentration in returned Formalin, percent | Higher boiling products, kg./hr. |
|---|---|---|---|---|---|---|---|
| 2 | 11.0 kg./hr. of crude dioxane plus 1.0 kg./hr. of evaporation residue containing 0.7% of $H_3PO_4$. | 96.3 | 3.65 | 0.7 | 11.25 kg./hr. containing 21.4% of formaldehyde. | 0.01 | 1.42 |
| 3 | 11.0 kg./hr. of crude dioxane plus 0.3 kg./hr. evaporation residue containing 1.8% of $H_3PO_4$ plus 0.7 kg./hr. of returned product from decomposition reaction. | 97.6 | 3.65 | 0.4 | 11.16 kg./hr. containing 20.3% of formaldehyde. | 0.01 | 1.39 |

(e) returning the formaldehyde solution obtained from the decomposition reaction of step (d) which contains phosphoric acid to the first reaction stage.

2. Process as claimed in claim 1 wherein said 4,4-dimethyl - m - dioxane and said by-products are fed into a fluidized bed reactor in the second stage, step (d).

3. Process as claimed in claim 1 wherein the quantity of phosphoric acid is from 0.03 to 0.5% by weight.

4. Process as claimed in claim 1 wherein the temperature employed in the preparation of 4,4-dimethyl-m-dioxane, step (a), is 120° C. to 160° C.

5. Process as claimed in claim 1 wherein the decomposition of 4,4 - dimethyl - m - dioxane to isoprene in step (d) is carried out at 250° C. to 350° C.

6. Process as claimed in claim 1 wherein the phosphoric acid is formed from organic phosphoric acid esters.

7. Process as claimed in claim 6 wherein the organic phosphoric acid esters used are triethylphosphate, tri-n-butylphosphate and triisobutylphosphate.

8. Process as claimed in claim 1 wherein the level of phosphoric acid in the cycle is kept constant by the addition of fresh orthophosphoric acid and/or organic phosphoric acid esters.

9. Process as claimed in claim 1 wherein the aqueous phase remaining from the first stage of the process after removal of the organic phase is evaporated, if desired after first purifying it by extraction, and the phosphoric acid which has become concentrated in the sump of the distillation column is carried forward to the second stage of the process together with the higher boiling organic sump products.

10. Process as claimed in claim 1 wherein decomposition of the crude dioxane formed in the first stage of the process is carried out together with the distillation sump containing phosphoric acid from step (C).

11. Process as claimed in claim 1 wherein the decomposition of 4,4 - dimethyl - m - dioxane is carried out in a fluidized bed on a catalyst which consists of silicic acid impregnated with phosphoric acid.

12. Process as claimed in claim 1 wherein the phosphoric acid which has been discharged with steam in the process of the dioxane decomposition is returned to the first stage of the process together with formaldehyde which is also in the aqueous phase.

References Cited

UNITED STATES PATENTS

| | | | |
|---|---|---|---|
| 2,350,485 | 6/1944 | Arundale et al. | 260—681 |
| 2,350,517 | 6/1944 | Mikeska et al. | 260—681 |
| 2,335,691 | 11/1943 | Mottern | 260—681 |
| 3,221,074 | 11/1965 | Stanley | 260—681 |
| 3,494,975 | 2/1970 | Kronig et al. | 260—681 |
| 3,562,350 | 2/1971 | Juguin et al. | 260—681 |

FOREIGN PATENTS

| | | | |
|---|---|---|---|
| 857,135 | 12/1960 | Great Britain | 260—681 |
| 893,206 | 4/1962 | Great Britain | 260—681 |

DELBERT E. GANTZ, Primary Examiner

C. E. SPRESSER, Jr., Assistant Examiner

UNITED STATES PATENT OFFICE
CERTIFICATE OF CORRECTION

Patent No. 3,773,847        Dated November 20, 1973

Inventor(s) Paul Losacker et al

It is certified that error appears in the above-identified patent and that said Letters Patent are hereby corrected as shown below:

Column 4, line 67, should read -- Example 2 --;
Column 6, Table 2, Converted isobutene percent column should be corrected to read:

| | |
|---|---|
| 2------ | 67.3 |
| 3------ | 63.6 |
| 4------ | 59.7 |
| 5------ | 72.3 |
| 6------ | 59.2 |

Column 7, lines 16 and 17 delete "for mixture was arranged 30 mm. above the inlet connection";
Column 8, line 20, "mixture was" should read -- mixture which --

Signed and sealed this 4th day of June 1974.

(SEAL)
Attest:

EDWARD M. FLETCHER, JR.
Attesting Officer

C. MARSHALL DANN
Commissioner of Patents